United States Patent
Josse et al.

(10) Patent No.: US 10,239,776 B2
(45) Date of Patent: *Mar. 26, 2019

(54) ORGANICS AND NUTRIENT RECOVERY FROM ANAEROBIC DIGESTER RESIDUES

(71) Applicant: Anaergia Inc., Burlington (CA)

(72) Inventors: Juan Carlos Josse, Mission Viejo, CA (US); Andrew Benedek, Rancho Santa Fe, CA (US); Michael David Thedoulou, Milton (CA); Zachary Scott, La Jolla, CA (US)

(73) Assignee: ANAERGIA INC., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,574

(22) Filed: Nov. 23, 2016

(65) Prior Publication Data

US 2017/0073261 A1 Mar. 16, 2017

Related U.S. Application Data

(63) Continuation of application No. 13/823,404, filed as application No. PCT/CA2012/050907 on Dec. 18, 2012, now Pat. No. 9,533,903.

(Continued)

(30) Foreign Application Priority Data

Feb. 17, 2012 (CA) ................. PCT/CA2012/000144

(51) Int. Cl.
*C02F 9/00* (2006.01)
*C02F 1/20* (2006.01)
(Continued)

(52) U.S. Cl.
CPC ............ *C02F 9/00* (2013.01); *B01D 19/0036* (2013.01); *C02F 1/20* (2013.01); *C02F 3/12* (2013.01);
(Continued)

(58) Field of Classification Search
CPC .... C02F 9/00; C02F 11/12; C02F 3/30; C02F 11/04; C02F 3/12; C02F 1/20;
(Continued)

(56) References Cited

U.S. PATENT DOCUMENTS 1,014,893 A   1/1912 Henry
1,328,259 A   1/1920 Barbet
(Continued)

FOREIGN PATENT DOCUMENTS

CA   2343832 A1   10/2002
CA   2381623 A1   10/2002
(Continued)

OTHER PUBLICATIONS

Ammonia Recovery Process, http://www.thermoenergy.com/water-technologies/, retrieved on line 2011, 1 page. Publication Date Unknown.

(Continued)

*Primary Examiner* — Fred Prince

(57) ABSTRACT

Sludge from an anaerobic digester is treated to recover one or more of fibers, or solids or liquids with a high nutrient content. The solids or liquids can be used as a fertilizer. The fibers can be used in a plant growing medium. Solids are separated from liquids in the sludge and dried. The solids may be dried to produce a flake or pellet. Ammonia in the liquids is recovered and used to produce a concentrated acidic ammonium salt solution. This solution may be mixed with the solids to produce a nitrogen enhanced solid. The fibers and solids or liquids can also be used in combination to produce an enhanced plant growing medium. A device and process for removing ammonia from a liquid can be used in the system or separately.

16 Claims, 4 Drawing Sheets

Related U.S. Application Data

(60) Provisional application No. 61/578,703, filed on Dec. 21, 2011, provisional application No. 61/707,467, filed on Sep. 28, 2012.

(51) Int. Cl.

| | | |
|---|---|---|
| *C02F 3/12* | (2006.01) | |
| *C02F 7/00* | (2006.01) | |
| *C02F 11/04* | (2006.01) | |
| *C05F 17/00* | (2006.01) | |
| *C02F 3/30* | (2006.01) | |
| *C02F 11/12* | (2006.01) | |
| *C05C 11/00* | (2006.01) | |
| *C02F 1/02* | (2006.01) | |
| *C05F 7/00* | (2006.01) | |
| *B01D 19/00* | (2006.01) | |
| *C02F 101/16* | (2006.01) | |
| *C02F 103/00* | (2006.01) | |

(52) U.S. Cl.
CPC ............... *C02F 3/30* (2013.01); *C02F 11/04* (2013.01); *C02F 11/12* (2013.01); *C05C 11/00* (2013.01); *C05F 7/00* (2013.01); *C05F 17/0018* (2013.01); *C05F 17/0027* (2013.01); *C05F 17/0045* (2013.01); *C02F 1/02* (2013.01); *C02F 2101/16* (2013.01); *C02F 2103/005* (2013.01); *Y02P 20/145* (2015.11); *Y02W 10/15* (2015.05); *Y02W 10/23* (2015.05); *Y02W 30/43* (2015.05); *Y02W 30/47* (2015.05)

(58) Field of Classification Search
CPC ........... C02F 2103/005; C02F 2101/16; C05C 11/00; C05F 17/0027; C05F 17/0018; C05F 17/0045; C05F 7/00; B01D 19/0036; Y02P 20/145; Y02W 10/15; Y02W 10/23; Y02W 30/47; Y02W 30/43
USPC ................ 210/603, 605, 609, 612, 630, 903
See application file for complete search history.

(56) References Cited

U.S. PATENT DOCUMENTS

| | | |
|---|---|---|
| 2,000,444 A | 5/1935 | Hechenbleikner |
| 2,289,953 A | 7/1942 | Aldridge |
| 2,854,827 A | 10/1958 | Lockerbie et al. |
| 2,937,506 A | 5/1960 | Stirlen |
| 3,255,887 A | 6/1966 | Walker et al. |
| 3,517,732 A | 6/1970 | Robert |
| 3,618,905 A | 11/1971 | Sergio |
| 3,864,440 A | 2/1975 | Giocoechea |
| 4,098,690 A | 7/1978 | Semmens |
| 4,162,147 A | 7/1979 | Haverkamp |
| 4,294,812 A | 10/1981 | Oler |
| 4,414,103 A | 11/1983 | Farrell |
| 4,618,462 A | 10/1986 | Fisher |
| 4,770,748 A | 9/1988 | Cellini et al. |
| 4,861,524 A | 8/1989 | Sielaff et al. |
| 4,880,504 A | 11/1989 | Cellini et al. |
| 5,030,362 A | 7/1991 | Da et al. |
| 5,273,572 A | 12/1993 | Baker et al. |
| 5,458,789 A | 10/1995 | Dickerson et al. |
| 5,593,590 A | 1/1997 | Steyskal |
| 5,863,444 A | 1/1999 | Murphy et al. |
| 6,149,887 A | 11/2000 | Lagas et al. |
| 6,162,284 A | 12/2000 | Mitchell et al. |
| 6,299,774 B1 | 10/2001 | Ainsworth et al. |
| 6,368,849 B1 | 4/2002 | Norddahl |
| 6,383,544 B1 | 5/2002 | Elkins |
| 6,409,788 B1 | 6/2002 | Sower |
| 6,464,875 B1 | 10/2002 | Woodruff |
| 6,569,332 B2 | 5/2003 | Ainsworth et al. |
| 6,682,578 B2 | 1/2004 | Sower |
| 6,692,642 B2 | 2/2004 | Josse et al. |
| 6,715,743 B2 | 4/2004 | Zhang |
| 6,838,069 B2 | 1/2005 | Blonigen et al. |
| 6,846,343 B2 | 1/2005 | Sower |
| 6,866,779 B1 | 3/2005 | Burke |
| 6,916,426 B2 | 7/2005 | Van et al. |
| 6,984,323 B2 | 1/2006 | Khudenko |
| 7,014,768 B2 | 3/2006 | Li et al. |
| 7,153,427 B2 | 12/2006 | Burke |
| 7,204,967 B2 | 4/2007 | Bierle et al. |
| 7,416,644 B2 | 8/2008 | Bonde |
| 7,731,850 B2 | 6/2010 | Choi et al. |
| 7,806,957 B1 | 10/2010 | Burke |
| 7,927,491 B2 | 4/2011 | Kotelko et al. |
| 8,470,567 B2 | 6/2013 | Facey et al. |
| 9,045,355 B2 | 6/2015 | Kumar et al. |
| 2001/0004063 A1 | 6/2001 | Oh |
| 2001/0033816 A1 | 10/2001 | Blonigen et al. |
| 2002/0158024 A1 | 10/2002 | Van et al. |
| 2003/0084693 A1 | 5/2003 | Sower |
| 2003/0201225 A1 | 10/2003 | Josse et al. |
| 2005/0047995 A1 | 3/2005 | Wylie |
| 2005/0139546 A1 | 6/2005 | Burke |
| 2006/0006055 A1 | 1/2006 | Bonde |
| 2007/0048212 A1 | 3/2007 | Bierle et al. |
| 2007/0141691 A1 | 6/2007 | Hirl |
| 2007/0297953 A1 | 12/2007 | Kemp et al. |
| 2008/0053909 A1 | 3/2008 | Fassbender |
| 2008/0053913 A1 | 3/2008 | Fassbender |
| 2008/0152571 A1 | 6/2008 | Hu et al. |
| 2008/0156709 A1 | 7/2008 | Johnson |
| 2008/0156726 A1 | 7/2008 | Fassbender |
| 2008/0302722 A1 | 12/2008 | Burke |
| 2009/0014377 A1 | 1/2009 | Janssen et al. |
| 2009/0206028 A1 | 8/2009 | Jiang et al. |
| 2010/0065250 A1 | 3/2010 | Frommann |
| 2010/0170845 A1 | 7/2010 | Baur |
| 2010/0187182 A1 | 7/2010 | Vago |
| 2010/0218573 A1 | 9/2010 | Van |
| 2011/0091954 A1 | 4/2011 | Chen et al. |
| 2014/0033776 A1 | 2/2014 | Josse et al. |
| 2014/0144195 A1 | 5/2014 | Callendrello et al. |
| 2014/0157846 A1 | 6/2014 | Jeppson et al. |
| 2014/0314657 A1 | 10/2014 | Zhao et al. |
| 2017/0334739 A1 | 11/2017 | Theodoulou et al. |

FOREIGN PATENT DOCUMENTS

| | | |
|---|---|---|
| CA | 2416690 A1 | 7/2004 |
| CA | 2416690 C | 8/2008 |
| CA | 2799408 A1 | 11/2011 |
| DE | 2726233 A1 | 12/1978 |
| DE | 4444032 C1 | 5/1996 |
| EP | 0494154 B1 | 9/1995 |
| GB | 2139610 A | 11/1984 |
| GB | 2383034 A | 6/2003 |
| WO | 9942423 A1 | 8/1999 |
| WO | 2010096899 A1 | 9/2010 |
| WO | 2011156767 A2 | 12/2011 |
| WO | 2012109737 A1 | 8/2012 |
| WO | 2013091094 A1 | 6/2013 |
| WO | 2014094162 A1 | 6/2014 |

OTHER PUBLICATIONS

Bonmati et al., "Air Stripping of Ammonia From Pig Slurry: Characterisation and Feasibility as a Pre- or Post-Treatment to Mesophilic Anaerobic Digestion", Waste Management, 2003, vol. 23 (3), pp. 261-272.

Cast Systems, www.thermoenergy.com/water-technologie/technologies . . . , 2011, retrieved from the Internet Nov. 2, 2011, 1 Page.

CASTion Corporation, A Thermo Energy Company, "Ammonia Removal in Municipal Sludge Dewatering Centrate", Pilot Test Results on Centrate, Dec. 1, 2008, 16 Pages.

(56) References Cited

OTHER PUBLICATIONS

Constantine, "An Overview of Ammonia and Nitrogen Removal in Wastewater Treatment", CH2M Hill Canada, Feb. 19, 2008.
Constantine, "North American Experience with Centrate Treatment Technologies for Ammonia and Nitrogen Removal", WEFTEC Conference, 2006, pp. 5271-5281.
Dhaliwal et al., "Distillation of Ammonia from Water and Wastewater," Water Pollution Control Federation, Oct. 1985, vol. 57 (10), pp. 1036-1039.
EPA, "Wastewater Technology Fact Sheet Ammonia Stripping," United States Environmental Protection Agency, Sep. 2000, 4 pages.
European Application No. 12860692, Supplementary European Search Report dated Jul. 16, 2015.
European Application No. 13866334.9, Supplementary Partial European Search Report dated Oct. 21, 2016.
European Patent Application No. 12860692.8, Office Action dated Dec. 12, 2016.
Fernandez-Seara et al., "Distillation Column Configurations in Ammonia-Water Absorption Refrigeration Systems", International Journal of Refrigeration, Jan. 2003, vol. 26 (1), pp. 28-34.
Groth et al., English Language Abstract of DE4444032 entitled "Manure treatment in two stages, to release ammonia and concentrate slurry", published May 2, 1996, 1 page.
International Patent Application No. PCT/CA2012/000144, International Preliminary Report on Patentability dated Aug. 29, 2013.
International Patent Application No. PCT/CA2012/000144, International Search Report dated Jul. 10, 2012.
International Patent Application No. PCT/CA2012/050907, International Preliminary Report on Patentability dated Jul. 33, 2014.
International Patent Application No. PCT/CA2012/050907, International Search Report dated Mar. 25, 2011.
International Patent Application No. PCT/CA2013/050985, International Preliminary Report on Patentability dated Jul. 32, 2015.
International Patent Application No. PCT/CA2013/050985, International Search Report and Written Opinion dated Apr. 24, 2014.
International Patent Application No. PCT/CA2015/051154, International Search Report and Written Opinion dated Jan. 25, 2016.
Jorgensen et al., "Ammonia Removal from Wastewater by Ion Exchange in the Presence of Organic Contaminants," Water Research, 2003, vol. 37, pp. 1723-1728.
Oilgae, "New Technologies in Ammonia Removal from Wastewater", http://www.oilge.com/algae/cult/sew/new/amm/amm.html, retrieved online Dec. 14, 2011, 10 Pages.
Orentlicher, et al., "Savings from Integration of Centrate Ammonia Reduction with BNR Operation: Simulation of Plant Operation," ThermoEnergy Corporation, HydroQual Inc., 2009 International Conference on Nutrient Recovery from Wastewater Streams, 2009, http://web2.uconn.edu/seagrantnybight/documents/nutrient%20docs/Orentlicher%20Savings%20Integration%20Centrate%20Ammonia%20Reduction.pdf, 25 pages.
Thermoenergy, "Ammonia Removal and Recovery Systems for Industrial Wastewater Treatment", http://www.thermoenergy.com/water-technologies/industrial-solutions/ammonia-removal..., retrieved online Dec. 14, 2011, 2 Pages.
U.S. Appl. No. 13/823,404, Final Office Action dated Feb. 9, 2016.
U.S. Appl. No. 13/823,404, Office Action dated Feb. 13, 2015.
U.S. Appl. No. 13/823,404, Office Action dated May 21, 2015.
U.S. Appl. No. 13/982,585, Office Action dated Dec. 14, 2015.
U.S. Appl. No. 13/982,585, Office Action dated Sep. 18, 2015.
U.S. Appl. No. 14/652,615, Office Action dated Feb. 10, 2017.
Written Opinion for Application No. PCT/CA2012/000144, dated Jul. 10, 2012, 5 pages.
Written Opinion for Application No. PCT/CA2012/050907, dated Mar. 25, 2013, 10 pages.
Canadian Patent Application No. 2,826,025, Office Action dated Oct. 16, 2017.
European Patent Application No. 12746463.4, Examination Report dated Jun. 21, 2018.
European Application No. 13866334.9, Supplementary Partial European Search Report dated Feb. 20, 2017.
European Patent Application No. 12746463.4 Communication pursuant to Rule 70(2) and 70a(2) EPC dated Jul. 7, 2017.
European Patent Application No. 12746463.4, Extended European Search Report dated Jun. 21, 2017.
European Patent Application No. 12860692.8, Office Action dated Jan. 4, 2018.
European Patent Application No. 15857098.6, Extended European Search Report dated Jun. 6, 2018.
U.S. Appl. No. 15/209,293, Restriction Requirement dated Feb. 16, 2018.
U.S. Appl. No. 15/209,293, Non-Final Office Action dated May 14, 2018.
U.S. Appl. No. 14/652,615, Final Office Action dated Jun. 7, 2017.
U.S. Appl. No. 14/652,615, Notice of Allowance dated Jul. 21, 2017.
U.S. Appl. No. 14/934,780, Non-Final Office Action dated Dec. 15, 2017.
U.S. Appl. No. 14/934,780, Notice of Allowance dated Apr. 5, 2018.
U.S. Appl. No. 14/934,780, Restriction Requirement dated Sep. 14, 2017.

ORGANICS AND NUTRIENT RECOVERY FROM ANAEROBIC DIGESTER RESIDUES

CROSS REFERENCE TO RELATED APPLICATIONS

This application is a continuation of U.S. application Ser. No. 13/823,404, filed Mar. 14, 2013, which is a national phase entry of PCT/CA2012/050907, filed on Dec. 18, 2012, which claims the benefit of U.S. provisional application No. 61/707,467 filed on Sep. 28, 2012 and U.S. provisional application No. 61/578,703 filed on Dec. 21, 2011. This application also claims priority from International Application Number PCT/CA2012/000144 filed on Feb. 17, 2012. US application Ser. Nos. 13/823,404; 61/707,467; and 61/578,703 and International Application Numbers PCT/CA2012/050907 and PCT/CA2012/000144 are hereby incorporated by reference.

FIELD

This specification relates to the recovery of organics and nutrients from waste, to anaerobic digestion alone or in combination with a wastewater treatment plant, to products such as fertilizer or compost made from anaerobic digester residue device, and to a method for removing ammonia from water, such as sludge dewatering centrate.

BACKGROUND

The following discussion is not an admission that anything discussed below is common general knowledge or citable as prior art.

Various organic waste products contain nutrients that make the waste potentially valuable as fertilizer. For example, some animal manures and organic sludges or slurries could be applied directly to land. However, due for example to the large quantities of material involved relative to the nutrient content, and potential problems with odors, this practice is limited to selected appropriate operations located near the source of the waste. The manure, sludge or slurry might be treated to remove large fibers, physically dewatered, partially dried thermally, extruded into a solid fertilizer product and then further thermally dried. However such a product would not be stable and would tend to decompose or attract mold during storage because of its high biodegradable organic matter content. Alternatively, manures, sludges or slurries could be digested in an anaerobic digester to produce a biogas. The digested sludge could then be applied to the land as a fertilizer. While the biogas produced is useful as a fuel, use of the digester sludge as a fertilizer is still limited to selected appropriate operations near the source of the waste.

In an activated sludge wastewater treatment plant, ammonia is removed from the wastewater at least in jurisdictions with relevant discharge regulations. In these plants, waste activated sludge may be sent to an anaerobic digester. Sludge from the digester, comprising digestate, is typically de-watered before it is disposed or treated further. The liquid stream from the de-watering device, which may be called reject water, centrate or filtrate, is often returned to the main activated sludge process. This centrate contains ammonia, and there have been some attempts to remove ammonia from the centrate before it is sent back to the main process. A paper by Tim Constantine, presented at the 2006 WEFTEC conference and entitled "North American Experience with Centrate Treatment Technologies for Ammonia and Nitrogen Removal", provides a summary of ammonia removal technologies that have been used in North American facilities.

US Patent Application Publication Number 2007/0297953 to Kemp et al. describes a system in which ammonia is removed from water in a vacuum assisted flash stripping tower. The water is treated before stripping to remove solids removal tank and multivalent cations and increase its pH.

U.S. Pat. No. 7,416,644 to Bonde describes a fermenter with a side stream ammonia stripping step. Ammonia is stripped from fermented biomass in a shunt. Effluent from the fermenter passes through the shunt while water vapor is injected into the shunt.

INTRODUCTION

The following paragraphs are intended to introduce the reader to the more detailed description to follow, and not to limit or define any claimed invention.

This specification describes, among other things, a fertilizer product, a method of making a fertilizer product, a method of treating anaerobic digester sludge and a waste treatment process including anaerobic digestion. In brief, sludge from an anaerobic digester is treated to produce a generally dry nitrogen rich fertilizer product, which may be called a pellet or a granule herein.

In a treatment plant and process described in further detail below, solids are separated from liquids in the sludge and dewatered, dried or both. The liquids in the sludge contain aqueous ammonia that is released in one or more gasses or liquids produced during dewatering or drying. These liquids or gases are collected and then treated in an ammonia recovery system to produce a concentrated acidified ammonium salt solution. This solution, relative to the liquid in the digester sludge, has a higher concentration of ammonia, reduced alkalinity and reduced pH. The acidic ammonium solution is reintroduced to the dried solids to produce a moist pellet. The moist pellets are then dried at ambient to moderate temperatures, for example by a flow of warm air over the pellets. After drying the pellets, ammonia from the recovered liquid remains with the pellets as an ammonium salt.

Anaerobic digester sludge is more stable than the undigested feedstock because it has a reduced concentration of biodegradable solids. Nevertheless, anaerobic digester sludge contains carbon and nitrogen, among other nutrients, in mineralized and organic forms that are useful as fertilizer. However, the nitrogen exists primarily in aqueous forms of ammonia. A typical digester sludge dewatering process would therefore lose much of the ammonia with removed water. Further, the liquid in the digested sludge also has a high pH and is heavily buffered with alkalinity. Heating the de watered sludge cake under typical sludge drying temperatures, given its high pH, would convert the ammonia remaining in the liquid in the cake primarily into ammonia gas, resulting in more loss of ammonia along with the evaporated water.

However, in a process and apparatus described herein, one or more of the liquids, vapors or gases produced by dewatering or drying the sludge, or both, are collected and processed in an ammonia recovery system. In the recovery system, water or vapor with an increased concentration of ammonia and reduced alkalinity is created and mixed with an acid. Wth reduced volume and alkalinity (relative to the water in the digester sludge), a reasonable amount of acid is able to produce an ammonia containing liquid with low pH.

Alternatively, a concentrated ammonium hydroxide solution can be produced in the recovery system from the collected gases, optionally with added water, optionally after a de-aeration process to separate ammonia gas from water vapour. Further, the volume of liquid carrying the recovered ammonia is reduced to the point where it is feasible to reintroduce the concentrated ammonia liquid into the dried solids in a pellet making process. The produced pellets are moist and have a high surface area per unit volume, allowing drying by way of a flow of air at moderate temperature to produce a pellet dry enough, considering the stabilized nature of the solids, for storage and transport. With the moisture in the pellet at a low pH and drying at moderate temperatures, ammonia ions in the moist pellet tend to precipitate as salts that remain with the pellets rather than forming ammonia gas. In this way, the apparatus and process described herein produce a pellet with higher nitrogen content than would be achieved merely by dewatering, drying and pelletizing the anaerobic digester sludge.

This disclosure also describes a system and process to recover fibers, or solids or liquids with a high nutrient content, or both, from anaerobic digester residues. The fibers can be used in a plant growing medium. The solids, for example in a granule or flake form, or liquids can be used as a fertilizer. The fibers and solids or liquids can also be used in combination to produce a plant growing medium.

A device and process for removing ammonia from a liquid are described herein. The ammonia flows through a series of sequential stages. Bubbles, for example of air, are provided in the liquid in the stages. At the same time, air flows across the surface of the liquid in the stages. The flow rate of the surface flow is greater than the flow rate of the bubbles.

The device and process for removing ammonia can be used in the system and process to recover fibers, or solids or liquids with a high nutrient content, or both, from anaerobic digester residues. Alternatively, the device and process for removing ammonia can be used in other applications, for example removing ammonia from municipal wastewater plant digester centrate or other waste streams with ammonia. The device and process for removing ammonia can be used in combination with a commercial acid or ammonia scrubber.

Elements of the various systems and process described herein may be combined. For example, solids, liquids or vapors produced in a system and process described herein for making flakes can be used to make a pelletized fertilizer as described herein.

FIGURES

DETAILED DESCRIPTION

Figure 1:
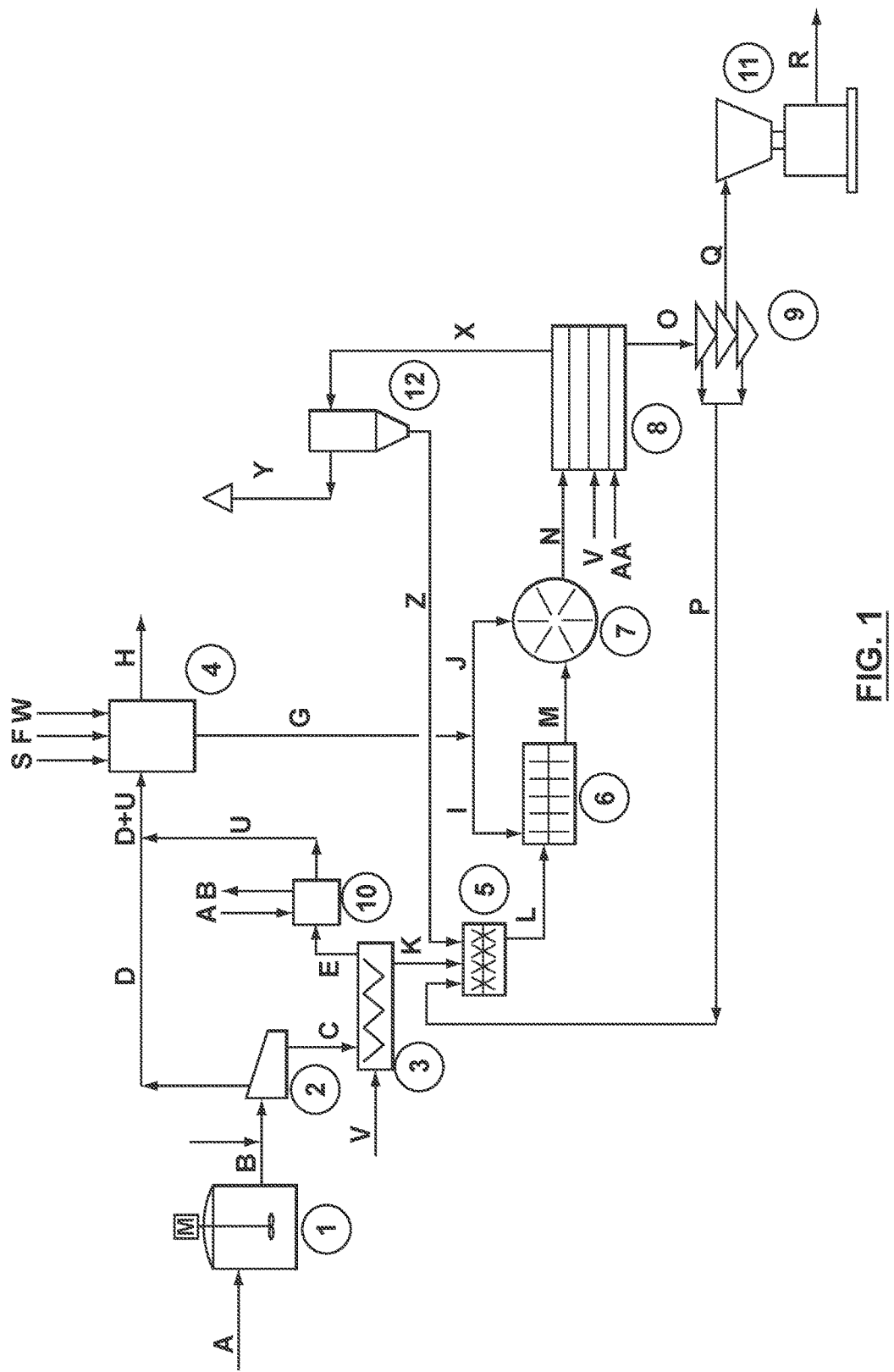
FIG. 1 is a schematic process flow diagram for a plant for treating sludge to produce a fertilizer pellet, coupled with an anaerobic digester to produce the sludge from a waste stream.

FIG. 1 shows a plant for producing a solid fertilizer product, pellets Q, from sludge, particularly anaerobic digester residue or digestate B. This plant is coupled with an anaerobic digester 1, which produces the digestate B from a waste stream or feed stock A. Examples of suitable digester feedstock A that results in high nutrient content digestate B include animal manure, post consumer food waste, pre consumer food processing waste, biofuels processing by products, agricultural waste, and municipal wastewater sludge, among others. The origin and nature of the feed stock A, and possibly the type of chemicals used in the fertilizer production process to be described below, may allow the fertilizer product to be labeled as "organic" or by another related term in accordance with applicable regulations. The product may be called a pellet or a granule. Either of these words may be used herein to denote a substantially dry product in the form of many small (for example 1 mm to 50 mm in the largest dimension) pieces, but without intending to limit the product to any particular size or shape of product.

Solid fertilizer products typically have a higher value than raw wastes or liquid fertilizer products because a solid product facilitates transporting, storing and using the fertilizer with less cost and with reduced nuisance, particularly odors. In general, it is desirable for a solid fertilizer product to have a substantial concentration of nutrients, including nitrogen. The product should also have a low concentration of pathogens and be organically stable such that it does not decompose and grow mold readily in storage. It is also advantageous for the product to be sufficiently hard, uniformly sized and flowable through machinery so as to allow the product to be stored, transported and broadcast with conventional dry fertilizer application equipment used in agriculture and horticulture. The size and shape of a pellet Q can be made to satisfy the physical requirements described above. The steps involved in processing the digestate B, to be described in more detail below, are intended to avoid the loss of nutrients, particularly nitrogen, that might otherwise occur if digestate B were more simply dewatered, dried and pelletized.

For comparison, some animal manures and organic sludges and slurries could be dewatered without anaerobic digestion and then thermally dried and extruded, after removing large fibers, to produce a pellet. Such a product would not be stable and instead would be prone to decompose and grow mold during storage. The product would also have a significantly reduced nitrogen content compared to the feedstock since most of the soluble nitrogen present in the raw waste would be lost during dewatering and drying and would not be incorporated into the pellets.

Alternatively, and for further comparison, a manure, sludge or slurry could be first digested in an anaerobic digester and then mechanically dewatered, thermally dried and pelletized. The use of an anaerobic digester allows a biogas to be created and collected that can be used as a fuel for power or heat generation, or both. Anaerobic digestion also reduces greenhouse gas emissions relative to allowing organic waste to decompose to methane in the soil. The resulting pelletized sludge would also be more stable than the dried pelletized raw waste discussed above since many of the organic compounds in the raw waste are mineralized in the anaerobic digestion process, and in particular the concentration of carbon in biodegradable forms is greatly reduced. For these reasons, digesting the waste stream would be an improvement over simply pelletizing organic waste. However, the nitrogen content in the pellets would still be low since most of the organic nitrogen would be converted to ammonia that would exist primarily in the liquid fraction of the sludge. This ammonia would again be lost, for reasons that will be explained in more detail below, first with the liquid fraction removed during dewatering and then as ammonia gas during the thermal drying process.

The plant of FIG. 1 uses digester residue to produce fertilizer pellets but differs from the alternative described above in that additional steps are provided to retain nitrogen contained in the liquid fraction of the digestate B. The result is a stable fertilizer pellet, but with increased nitrogen compared to simply pelletizing the digestate solids. The fertilizer producing apparatus could be located separately from the anaerobic digester. However, when the fertilizer producing apparatus is co located with the anaerobic digester 1 as in FIG. 1, the need to move digestate B or intermediate products is reduced, the biogas or waste heat from power generation can be used in the fertilizer manufacturing process, and waste liquid streams may be advantageously returned to anaerobic digester 1.

As mentioned above, the nutrients in organic waste are partially mineralized, or converted into inorganic forms, in the anaerobic digestion process. Organic waste streams typically contain a combination of volatile and non volatile, or inert, solids. Volatile solids may comprise 70 to 90% of the solids fraction in typical waste streams amenable to anaerobic digestion. Depending on the nature of the volatile solids only a fraction, usually ranging from 40 to 80%, is anaerobically degradable by bacteria in digesters and is converted into methane, carbon dioxide and water. The solids remaining in the digestate still contain some carbon, and the loss in carbon has been compensated for by the production of biogas. The digestate also has generally unchanged amounts of other nutrients such as nitrogen, phosphorous and potassium. These nutrients tend to be mineralized during digestion and the inorganic forms of the nutrients may be more useful to plants than the organic forms. Therefore, in addition to being more stable due to the reduction in organic carbon, applying digestate to the land may provide more nutrient value to crops compared with the raw waste. However, some of the mineralized nutrients are aqueous or suspended. Since the goal is to produce a dry product, solids need to be separated from liquid in the digestate, This is typically done by mechanical separation (de watering) processes followed by thermal drying, meaning drying at a significant temperature for example 100 degrees C. or more. The effect of these processes on the nutrients phosphorous, potassium and nitrogen is discussed further below.

Phosphorous, in manure for example, is present mostly as organic phosphorous associated with particulate organic matter and dissolved unreactive phosphorous comprising organic phosphorous and polyphosphates. A minor proportion is dissolved reactive phosphorus or orthophosphate. Substantially all of the phosphorous present in the manure will still be present in the digester sludge. During anaerobic digestion, organic phosphorous contained in volatile solids and biomass solubilizes and adds to the soluble organic phosphorous present in the waste. The soluble organic phosphorous mineralizes and becomes adsorbed to particulate bound solids. Because phosphorous does not easily form gasses, it tends to stay in the manure or other substrates through digestion. Solids separation (de watering) operations performed on the sludge may partition up to 70% of phosphorous in a cake portion of the sludge, particularly if the solids separation process is augmented with coagulants. If only dewatering flocculants are used, then about 50% of the phosphorous may remain in the cake after de watering. The phosphorous contained in the liquid fraction of the cake will be substantially retained as solids when water evaporates as the cake is thermally dried.

Potassium is not highly reactive and is mostly present in a soluble form in manures and other organic slurries and sludge. Potassium remains essentially unchanged during digestion and it does not become a gas on drying. During sludge de watering, some potassium will remain in the liquid fraction removed and some will remain in liquids that are part of the solids fraction, or cake. When the cake is dried, potassium contained in the liquid portion of the cake will remain as a solid when water evaporates.

Nitrogen may be present in the feedstock as urea, amino acids, protein, and various other forms of particulate and soluble organic nitrogen. During anaerobic digestion, these organic forms undergo mineralization and are converted primarily into dissolved (aqueous) ammonia and ammonium. Passing through a digester has little effect on the total nitrogen content of the waste. A negligible amount of nitrogen may be emitted as NH3 (unionized ammonia gas), but the majority will be found as NH4 (ionized ammonia or ammonium) or ammonia gas in solution in the liquid fraction of the digester sludge, and a minor proportion as organic nitrogen in undigested volatile solids. The ammonium content of digester sludge is usually higher than that of the raw waste. The relative presence of ammonia (NH3 gas) and ammonium (NH4+ ion in solution) in the liquid of the digestate is a function of pH and temperature. A larger fraction is present as unionized ammonia (NH3 gas) with increased temperature and with increased pH. In the mesophilic and thermophilic range of digesters, operating at 35 to 55 degrees Celsius and at a pH of between 7.5 and 8.2, most of the reduced nitrogen exists as ammonium ions. Total ammonia concentrations are typically not allowed to exceed about 5000 ppm in mesophilic reactors and about 3000 ppm in thermopohilic reactors since the unionized ammonia fraction is toxic to methanogenic organisms. Therefore digesters for manures with high solids and high nitrogen content, such as digesters for poultry manure, are typically diluted.

During mechanical de watering of digestate, most of the nitrogen will be removed in the liquid fraction as soluble ammonium. The cake portion will only contain the ammonium dissolved in the liquid portion of the cake and organic nitrogen contained in undigested volatile solids. However, particularly in digestate containing a high nitrogen concentration that would be useful to produce fertilizer, the pH may be as high as 8.2 and the alkalinity can be as high as 8000 to 20000 mg/L as CaCO3. At this relatively high pH, when temperature increases during thermal drying of the cake, most of the ammonium contained in the cake moisture will shift to ammonia gas and will be driven off the cake along with the evaporated moisture. This further reduces the nitrogen content in the dried solids, and the nitrogen that remains will be mostly organic N that is not readily available to crops. Attempting to retain some of the nitrogen in the liquid by adding acid to the cake to reduce the pH would not likely be cost effective. The liquid in the cake is well buffered by the alkalinity and would require very large amounts of acid to be added to the cake to significantly reduce the pH.

In summary, for phosphorous and potassium, some but not necessarily most, of the nutrients are removed with water during mechanical digestate dewatering but remaining nutrients remain in the cake after thermal drying. In contrast, most of the nitrogen in digestate is removed with water during mechanical de watering, and most of the nitrogen that remains is driven off as a gas during thermal drying. Accordingly, and because nitrogen is arguably the most important nutrient, particular attention is paid to retaining nitrogen in the product fertilizer in the process that will be described below.

The process and apparatus of FIG. 1 produces a fertilizer pellet Q from a digestate B or, when coupled with an anaerobic digester 1, from a waste stream or feed stock A. The process recovers at least some, and preferably most, of the mineralized nitrogen present in the digestate B as an ammonium salt that is incorporated into the pellet Q. This increases the nitrogen content of the pellet Q, relative to merely dewatering and drying the digestate B, and provides the nitrogen in a from that is readily available to crops.

Since the nitrogen in the ammonium salt was originally present in the digestate B and the feed stock A, the pellet Q may qualify as a natural or organic fertilizer depending on applicable regulations.

In FIG. 1, animal manure or other digester feedstock (A) enters an anaerobic digester (1). Digested sludge or digestate (B) goes to a mechanical dewatering device (2), which can be for example a centrifuge, screw press, belt press, rotary press or any other mechanical dewatering device. Optionally, a flocculant or polymer (T) is added to help flocculate digested solids and increase solids capture and cake dryness. The dewatering device produces a cake (C) with solids content ranging, for example, from 14 to 30% or more depending on the digestate and the type of dewatering device used. The dewatering device (2) also produces a liquid stream (D) called centrate herein although filtrate or pressate or other words may be more appropriate depending on the dewatering device used. The cake (C) goes to an indirect thermal dryer (3) that may use, for example, biogas, natural gas or electricity as an energy source (V) to evaporate water from the cake. The dryer (3) can be, for example, a hollow screw type dryer with steam or hot oil circulation, a disc type dryer or a press type dryer, etc. Dry cake (K), though not absolutely dry, may be referred to as a solids fraction on the digestate (B).

An indirect enclosed dryer is used such that gasses (E) from the cake does not mix with combustion air or other gases, or with dust that the solids may produce in the drying process. Gasses (E) emitted from the cake (C) in the dryer will include water vapor and ammonia gas that evolves from liquid in the cake (C) as a result of a shift from ammonium (ion in solution) to ammonia (gas in solution) as the liquid is heated in the dryer (3). The gases (E), comprising water vapor and ammonia, go to a condenser (10), for example an indirect condenser that uses open loop or re circulating cooling water (A, B). Here vapor becomes condensate (U) comprising liquid water and ammonia in solution. It is desirable to maintain the condensate at a high temperature, for example 90 degrees C. or more. The condensate (U) and centrate (D) may be combined in a storage tank, which may be a separate tank or part of an ammonia recovery system (4). The relative high temperature of the condensate (U) increases the temperature of the combined liquid (D+U), for example to about 40 to 45 degrees Celcius, which is useful for a subsequent ammonia recovery step. The combined liquid (D+U) likely contains some solids from the centrate (D), but may be referred to as a liquid fraction of the digestate (B).

The combined liquid (D+U) is fed to an ammonia recovery system (4). The ammonia recovery system (4) can include, for example, a steam stripper, a vacuum and heat based stripping system, or an air stripper. In the ammonia recovery system, the combined liquid (D+U) is treated to release ammonia gas, typically with water vapor. The gas/vapor mix is collected and condensed as ammonium hydroxide (ammonia water) with an acid added to produce an acidic ammonium salt solution. The gas/vapor mix may be condensed before the acid is added, or the ammonia gas and water vapor mixture can be mixed without a distinct condensing step into an acidic solution. Optionally, the ammonium salt solution may then be further concentrated. Further optionally, additional acid may be added to the ammonium salt solution to further reduce its pH.

Although any form of ammonia recovery system might be used, centrates (D) with high ammonia content, which are thus suited for making fertilizer, also tend to have high alkalinities. For instance chicken manure digester centrate with a concentration of about 5000 mg/L ammonia N maintained by dilution in the digester (1), can have 16000 to 20000 mg/L of alkalinity. In the digester (1), carbon dioxide in the biogas reacts with ammonium to form ammonium carbonate, a strong buffering system. Such centrates (D) are well buffered and would require a large amount of caustic to increase the pH. Therefore, some ammonia recovery systems which would use a caustic to drive ammonia gas out of the combined liquid (D+U) would not be as cost effective as other systems due to the high chemical cost. For example, one system produced by Envimac Engineering GmbH relies on raising the pH to over 9.4 to drive the ammonium in a liquid to ammonia gas, and then strips the ammonia gas using from falling liquid using counter current air. A packed media bed is used to increase the surface area of a top sprayed liquid for improved mass transfer with the air. The air stripping is followed by an acid scrubber step. However, as discussed above, a large amount of caustic would be required to raise the pH of the buffered combined liquid (D+U).

Another option for recovering ammonia is using steam stripping. Ammonia removal systems using steam are also available, for example, from Envimac Engineering GmbH. These methods use less chemicals than air stripping methods, but require more energy than air stripping methods. Steam stripping methods may be particularly useful in plants where the combined liquid (D+U) flow rate is low relative to waste energy available to produce steam. Waste energy may include, for example, energy available from heat recovery steam generators using the exhaust gases from internal combustion gas engines operated with biogas in digestion plants, or low pressure steam boilers operating with biogas or other fuel that would not otherwise be used. A first steam decarbonation step may be used to drive carbon dioxide from the combined liquid (D+U) and reduce its buffering capacity. Some caustic is then added to raise the pH of the liquid, and an ammonia steam stripping step is applied wherein the liquid drops through a column of rising steam. Due to the heat of the stream, the ammonia can be driven out of the combined liquid (D+U) at a lower pH and so less caustic is required. The ammonia gas forms ammonium hydroxide (ammonia water) with the steam. An acid can then be added to the ammonium hydroxide to form a stable ammonium salt.

Another, and possibly preferred, option for an ammonia recovery system (4) uses a flash vacuum distillation systems in which ammonia gas is extracted from the combined liquid (D+U) using heat and vacuum to shift the ammonium to ammonia. The combined liquid (D+U) may be heated to about 80 degrees C. and then sprayed as a mist into a column under a vacuum, which causes the ammonia to be released from the liquid. The ammonia gas and some water vapor are collected in flow of air rising upwards through the column towards an inlet to the vacuum source. In the ROAST system produced by ThermoEnergy Corporation of Worscester, Mass., the vacuum source is a venturi nozzle through which water or an acidic solution is recirculated. When an acidic solution is recirculated, the collected gas/vapor mixture is drawn directly into the acidic solution to produce an ammonium salt solution generally simultaneously with condensation.

In an ammonia recovery system (4) requiring heat, heat of evaporation introduced to the dryer (3) may be recovered in the condenser (10) as hot water (AB), and that heat may be sufficient to further increase the temperature of the centrate and condensate mix (D+U) to about 50 degrees Celcius or more, possibly to 70 or 80 degrees Celcius. The salt produced in the ammonia recovery system may be, for example, ammonium sulfate, ammonium acetate or ammonium citrate, depending on the acid used. Ammonium sulfate in particular is accepted as a useful fertilizer.

The concentration of the ammonium salt solution initially produced in the recovery system (4) may be such that using all of the ammonium salt solution would introduce too much water to the mixer (6) and pelletizer (7) to be described below. Excess ammonium salt solution could be sold as a liquid fertilizer. Alternatively, the recovery system (4) may include an ammonium salt solution concentration step. The ammonium salt solution may be concentrated to, for example 35 to 45%, at which concentration all of the ammonium salt solution may be used in the pellets. The concentration can be done, for example by thermal distillation, by using gas permeable membranes or by flash evaporation. By any of these methods, water vapor is produced and removed from the salt solution. One suitable system is the CAST system, a modified flash evaporation system, produced by ThermoEnergy Corporation.

In summary, depending on the ammonia recovery system (4) used, ammonia is stripped from the combined liquid (D+U) by either increasing temperature by introducing heat or steam (S), and/or increasing pH adding a strong base such as sodium hydroxide (W) and/or reducing partial pressure by introducing vacuum. For ammonia recovery systems that rely on increasing the temperature of the liquid it is desirable to use the heat of evaporation recovered in the condenser (10), which is the heat of evaporation from the water removed in vapour (E) from wet cake in the dryer (3). In the ammonia recovery system (4), the ammonium is converted to ammonia gas, released from the combined liquid (D+U) and captured, typically in solution with water or water vapor from one or more of vapors from the combined liquid (D+U), stripping steam or recirculating liquid producing a vacuum. The ammonia gas released from the condensate/centrate stream (D+U) is reacted with an acid (F) to form a stable ammonium salt in solution. The acid added can be sulfuric, acetic, citric, or other. The resulting ammonium acid solution is preferably further concentrated, for example to 35 to 45%, for example using flash distillation with vacuum, heat, a gas permeable membrane, or combinations of these to produce a concentrated ammonium salt solution (G). In the ammonium salt concentration process, excess acid is preferably added to produce a salt solution with a low pH, for example 5 or less, or 3.5 to 5.

After ammonia recovery, the remainder of the centrate/condensate stream (D+U) exits the recovery unit (4) as an effluent (H) with reduced ammonia content. Ammonia removal ratios ranging from 40 to 90% are possible. The effluent (H) with reduced ammonia can be discharged to sewer, further treated for discharge to the environment or recirculated to the digester (1). The effluent (H) contains some phosphorus and potassium that can thereby be reintroduced into the digester (1). Further, the effluent (H) can function as dilution water to reduce the solids and ammonia content in the digester. As an example, in digesters (1) treating chicken manure, dilution water is required to reduce the solids content of the manure and reduce the ammonia concentration in the digestate to avoid the toxic effects of unionized ammonia on methane forming bacteria (methanogens). Returning the low ammonia effluent (H) to the digester (1) is useful to reduce the amount of new fresh dilution water required. When using ammonia recovery systems that require heat, the effluent (H) may exit at a relatively high temperature (for example 50 to 70 degrees C.). Using this as dilution water for the digester (1), if required, also contributes heat useful for operating the digester at preferred temperatures (for example 35 to 55 degrees C.) when returned for dilution of the digester feed (A).

Returning to the dryer (3), a dry solids stream (K) leaves the dryer (3) with, typically, 90 to 98% solids content. The dried solids (K) can exit as a flake, granule, or an aggregate depending on the dryer technology used. The dry solids (K) may be cooled in a discharge cooling conveyor before further processing. The dry solids (K) may pass through a crusher (5) to reduce the size of the granules, flakes or other forms of solid clumps coming out of the dryer (3). Crushed solids (L) go to a pin or other type of mill or mixer (6). In the mill (6), crushed solids and a first portion of the ammonium salt solution (I) are mixed. The resulting conditioned pelletizer feed (M) may have a solids content of, for example, 65 75% solids. The mill (6) homogenizes and conditions the material to introduce it to a granulator, for example a disc or pan pelletizer (7). In the pelletizer (7) the remaining ammonium salt solution (J), for example 10 30% of the ammonium salt solution (G), is introduced using spraying nozzles. The added liquid sprayed on the granules being formed by the rotation action of a pan pelletizer (7) acts as binder to help form granules. In an alternative process configuration, an extruder may be used instead of the disc granulator (7). The extruder uses a positive displacement pump or press to drive the conditioned material from the mill (6) through an extrusion die.

A granulated or extruded moist (or "green") pellet (N) is produced with approximately 60% to 70% solids content as a result of the moisture added with the ammonium salt solution (I+J). The ammonium salt becomes part of the moist pellet (N), increasing its nitrogen content and slightly reducing the pH of the moist pellet (N). The moist granule or pellet (N) goes to a dryer (8), for example a low temperature belt dryer, where air (AA) and heat (V) are introduced to dry the green pellet (N). The dryer (8) may operate at temperatures below 90 degrees C., for example between 60 and 80 degrees Celsius. The low temperature in conjunction with the low pH, particularly if the pH is further reduced with an acidic ammonium salt solution (G), minimizes the shift of ammonium to ammonia gas on drying and so minimizes ammonia loss in the dryer (8). As a result most of the ammonia introduced with the ammonium salt solution (G) remains as solids in the dry pellet (O). The pellets (O) may have a small nominal diameter, for example 1 to 4 mm, to provide a large surface area to further enable efficient direct drying with heated air at low temperature. Moisture is removed and the green pellets gain strength. Dry pellets (O) exit with 90 to 92% solids content.

Optionally, a sizing screen (9) classifies the dry pellets (O) within a specified size range. The undersized and oversized pellets (P) may go to the feed crusher (5) where they are crushed and blended with the solids (K) out of the dryer to feed the conditioning mill (6). The pellets retained between the screens in a specified particle size range, for example retained between 1 mm and 4 mm screens, exit the screen classifier (9) as finished pellets (Q). A transport device, such as a bucket elevator, may convey the finished pellets (Q) to a bagging unit (11) which may have, for example, a hopper, a filling head and a scale (11). The finished pellets (Q) may be bagged, for example, in 1 ton super sacks (R) for storage and distribution. Alternatively the finished pellets (Q) can be bagged in smaller bags, for example 5 to 50 pound bags, for distribution to retail stores.

The air exiting the belt dryer (X) may contain dust and may be directed to a cyclone (12), where collected dust (Z) is removed and sent to the conditioning mill (6). Cleaned air (Y) exits to the atmosphere with a low content of particulates. Optionally a bag house may be used after the cyclone (12) in locations with more restrictive particulate emission limits.

As an example, applying the process described above to digested poultry manure would, based on calculations, produce pellets with over 8% nitrogen concentration on a dry mass basis. In comparison, the raw manure in the calculation has a nitrogen concentration of 4%. For further comparison, simply de watering and drying the same digestate would result in pellets with no more than 3.5% nitrogen. Although any ammonia recovery would be beneficial, with many feedstocks it should be possible to add at least 2% to the nitrogen concentration of the pellets on a dry mass basis by way of ammonium salts precipitated from a solution containing ammonia recovered from a liquid fraction of the digestate.

Figure 2:
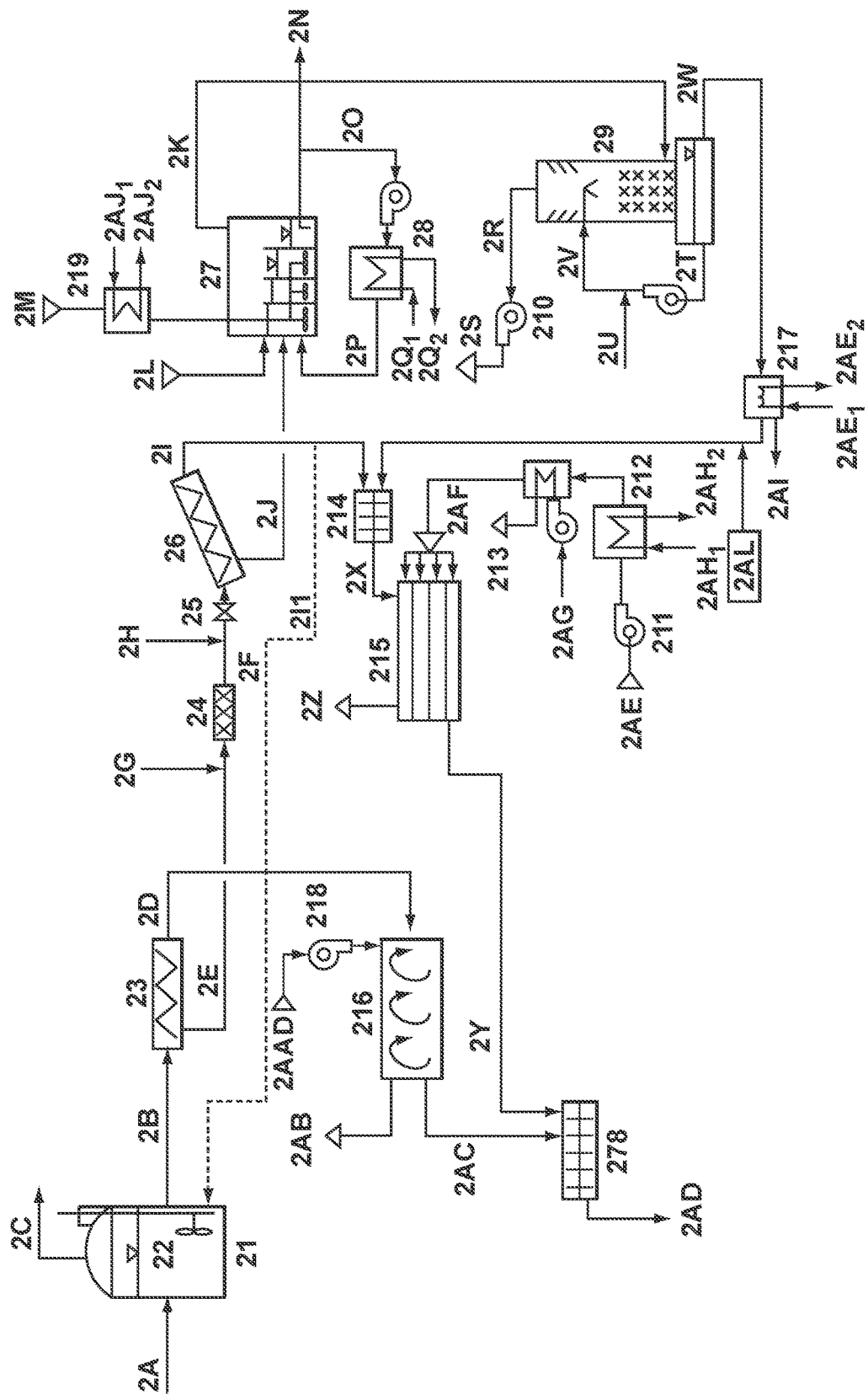
FIG. 2 is a schematic process flow diagram of a nutrients recovery system including an ammonia removal system.

Referring to FIG. 2, a digester feedstock (alternatively called a substrate), or combination of feedstocks, (2A) is fed to an anaerobic digester (21), which is stirred with a mixer (22). The digester (21) can be arranged in single or multiple stages. Depending on the substrate(s) (2A) the digestate (2B) may contain undigested fibrous material with lignocellulose. In addition to fibers, it may contain undigested suspended and colloidal organic matter particles that were not degraded by anaerobic bacteria, inorganic solids, and anaerobic bacteria that grow in the digester. Additionally the digestate (2B) is mixed in a sludge with water with ammonia, potassium and phosphorous in solution. The particulate solids may also have organic nitrogen and phosphorous.

Digestate (2B) is directed to a solids separator (23). The solids content of the digestate sludge may vary, for example, from 3 to 9% depending on the substrate and type of digester (21) and mixing system. The separator (23) is preferably a screw press with openings larger than 400 microns but smaller than 1000 microns. The separator (23) produces a solids cake (2D) and a liquid fraction (2E), alternatively called a reject, filtrate, centrate or pressate. Other solids separation devices can be used, such as screens or roller presses. The cake (2D) contains fibers and large particles retained by the press screen and a small fraction of the small particles in the digestate (2B), including some anaerobic bacteria, that independently would have passed the screen based on size but became trapped and entrained in the larger particle and fiber matrix. Cake solids content may range, for example, from 20 to 35%.

The solids separator (23) and steps treating the cake (2D) may optionally be omitted, particularly if there is not a significant concentration of solids, particularly fibrous solids, in the digestate (2B). A similar cake separation and related step may optionally be added to the system of FIG. 1 if its digestate contains fibrous solids.

The cake (2D) goes to composting, for example aerobic thermophilic composting. FIG. 2 shows an enclosed rotary mechanical drum composter (216) where atmospheric air (2AA) is fed by a blower (218). The composter shown is rotary drum type but other types of in-vessel composting processes can be used, such as systems with modified shipping containers or plastic agricultural bags. Open windrow composting can also be used. In the composter, temperature increases as a result of bacterial and fungal activity. Bacteria decompose simple organic compounds and fungi process more complex substrates in the compost. High temperatures are beneficial for the destruction of pathogenic organisms and undesirable weed seeds that may have survived the intestinal tract of ruminants if the feedstock to the digester includes animal manure, and also survived the anaerobic digestion process. Optionally, other or supplemental methods of pathogen and/or vector destruction may be used. Decomposition is more rapid in the thermophilic temperature range of 135° to 160° Fahrenheit. Foul air (2AB) that contains ammonia, VOCs and some particulates exit the composter. This air may be treated, for example in a biofilter. The compost (2AC) may be cured and then used to prepare, or as part of, a plant growing medium or mix.

Synthetic nitrogen fertilizers may be added to the compost (2AC) to increase its nutrient content and value as a soil enhancing medium. Alternatively, as described in the example of a process shown in FIG. 2, the addition of synthetic nitrogen is not required as nitrogen is recovered from the screw press (23) filtrate (2E) and incorporated into the blend as a high nutrient granule or flake (2Y). The process to produce this granule or flake is described below. A blender (278) blends compost (2AC) and high nutrient granules or flakes (2Y) to prepare a final soil medium product (2AD) can be done at the facility where the digester is located and the organics and nutrient recovery process takes place. Alternatively, the granules (2Y) and compost (2AC) may be shipped separately to a blending plant that also has bagging and packaging facilities. Yet a third option is to sell or use separately the compost (2AC) and the nutrient-rich granules or flakes (2Y). For example, the granules or flakes (2Y) can be used to enhance compost prepared by other processes. Alternatively, pellets or intermediate products produced by the system of FIG. 1 may be added to compost on site or in a separate facility.

The liquid fraction or filtrate (2E) out of the screw press (23) may have, for example, 2 to 5% total solids content depending on the digester feedstock (2A) and the size of the openings in the screw press (23) screen. The dissolved solids in the filtrate (2E) may be, for example, 1 to 1.5%. The rest of the solids content is suspended solids. Total solids removal in the press (23) varies depending on the digester feedstock and the screw press screen size but typical removal efficiencies are about 50% total suspended solids (TSS) and 35% total solids (TS). Associated with this separation, a portion of the nutrients in the digestate remain with the solids fraction out of the press. Typical portion of the nutrients remaining in the cake may be about 25% of N, 50% of P, and 6% of K.

Filtrate (2E) goes to a second step of solids separation. A coagulant salt (2G) such as ferric chloride or alum is added. A mixer (24) disperses the coagulant in the liquid stream. A dilute polymer (2H) is fed after to flocculate the microflocs formed by coagulant addition. A shear valve (25) enhances the dispersion of dilute polymer. The liquid dosed with coagulant and polymer enters a rotary screw dewaterer (26). In this dewaterer about 95% of the TSS and 65 to 70% of the TS is retained. Typical rates of N, P and K removal from the liquid are about 35% for N, 80% for P, and 8% for P. These nutrients remain in the cake (2I) along with the TSS. The cake has typically 20% to 22% solids content. The cake (2I) goes to a blender mill (214), where it is combined with ammonium sulfate (217) recovered from the filtrate (2J). Introducing ammonium sulfate increases the nitrogen content of the product.

In some cases when high rate, short hydraulic retention time anaerobic digesters are operated, it is important to return bacterial biomass to the digester. This increases the solids retention time in the digester and improves process stability. A large fraction of the suspended solids captured by the dewaterer and concentrated into cake (2I) is anaerobic bacteria. A portion of the cake (2I1) can be returned to the digester if needed or desirable for the operation of the digester (21). This can be done using a positive displacement pump. Optionally, a portion of filtrate (2E) may be returned to the digester (21). Both of streams (2E) and (2I) are advantageously reduced in liquid content, which helps increase the solids content in the digester. Stream (2I) is preferred as a means of solids recycle because of its higher solids content and reduced ammonia content relative to stream (2E).

The blend of cake and ammonium sulfate (2X) is fed to a thermal dryer (215). The dryer depicted in FIG. 2 is a low temperature direct belt dryer. Other dryers can also be used, such as indirect hollow screw, disc, thin film, direct drum, etc. The dryer removes moisture and leaves the solids. However, depending on the pH of the mixture and the dryer temperature, a portion of the ammonia in the cake/ammonium sulfate blend may volatilize and escape the dryer along with the evaporated water. Ammonia loss is minimized by reducing the pH below 6, such that most of the ammonia exists as ammonium ion and not as unionized ammonia gas that volatilizes. The pH reduction to 6 results in less than 5% ammonia loss while drying at 105 degrees C. Higher drying temperatures such as in direct drum dryers require reducing the pH to 5 to maintain the losses in the same range. Sulfuric acid (2AL) can be dosed into the ammonium sulfate line (217), to make a more acidic ammonium sulfate solution. Alternatively, ammonia may be recovered from dryer vapor as shown in FIG. 1.

In the direct low temperature belt dryer shown in FIG. 2, atmospheric air (2AE) is fed with a blower (2I1). The air is heated in a liquid to gas heat exchanger using waste heat as hot water (2AH1) in a closed loop from an internal combustion engine running on biogas (2C) or other source of waste heat. The return heating water (2AH2) goes in a closed loop to the waste heat source. If the available waste heat is insufficient to meet the requirements of the dryer, a fuel fired air heater (213) is used in addition to the waste heat air heater. The fuel (2AG) can be gaseous or liquid. The hot air (2AF) enters the belt dryer (215). Hot air (2Z) may go to air treatment to remove particulates and/or to a biofilter or thermal oxidizer depending on local emission standards. Hot air (2Z) can also be used as a heat source anywhere else in the process requiring heat. The granule or flake exiting the dryer (2Y) has a high content of nitrogen and phosphorous. The concentrations depend on the N and P content of the feedstock (2A).

The filtrate (2J) out of the dewatering device (26) goes to an ammonia stripping unit (27), optionally called a stripper. The ammonia stripping unit may be contained in an enclosed vessel, for example a rectangular box, or a cylindrical vessel, and can operate with a low liquid level, for example 1 m of depth or less, usually about 0.6 meters of depth. The volume of the vessel is such that it provides about 30 to 40, or even up to 70 minutes of hydraulic retention time based on filtrate throughput. The stripper receives subsurface diffused air (2M) through medium bubble diffusers, and optionally surface crossflow sweeping air (2L). The stripper operates at above ambient pressure, for example 50 degrees C. or more, or about 70 degrees C. or more. The stripper is heated by recirculating stripper effluent (2O) with a hot water centrifugal pump or circulator through a liquid/liquid heat exchanger (28). The heat exchanger is part of a hot water loop (2Q1 and 2Q2) and employs as a heat source waste heat from an internal combustion engine operating on biogas (2C) or another heat source. The heated return (2P) is directed to the inlet of the stripper (27). The stripper operates with multiple stages, for example 3 to 5 stages. The stages may be divided with perforated baffles or by other means such as a weir or piped connection with flow between the stages by gravity. Bubble diffusers are placed in each stage and connected to the diffused air 2M. After the last stage the stripper has an overflow weir that controls the level of the water in the stripper. An internal reservoir at the end of the stripper allows the effluent to de-aereate such that it can be pumped for recirculation heating or directed as effluent (2N) to a storage tank. Effluent (2N) can be used as dilution water for the digester, if required, or sent for disposal optionally after further treatment. In some cases mechanical de-aeration devices may be required in the circulation loop.

The stripper can remove ammonia without adding chemicals for pH increase. At 70 degrees C., the diffused air drives carbon dioxide out of the liquid. The crossflow air is introduced optionally at the surface of the liquid further reduces the concentration of carbon dioxide in the headspace of the stripper. This enables increased CO2 stripping. The CO2 is in the filtrate as ammonium bicarbonate which results from the digestion process and is in equilibrium with the high CO2 content of the biogas in the digester headspace, usually 30 to 45%. Stripping raises the pH to 9.2 or higher. At this high pH and high temperature, the majority of the ammonia becomes unionized ammonia gas in the filtrate and is driven out of solution and into the stripper headspace by the subsurface diffused air.

The surface crossflow air reduces the ammonia concentration in the stripper headspace at the interface between water and air. This is an equilibrium reaction. The dilution of the headspace facilitates ammonia removal due to the higher concentration gradient between the liquid and the air above it.

The combination of subsurface diffused air and crossflow air now laden with ammonia and CO2 (2K) is driven out of the stripper headspace by a slight negative pressure created by an induced draft fan (210), optionally part of a downstream ammonia acid scrubber. As a calculated example, a digestate filtrate flow of 170 gpm containing 5000 mg/L of ammonia will require 8,000 scfm of diffused air and 12,000 cfm of low pressure crossflow air to reach 90% ammonia removal operating at 70 degrees C. and pH 9.3. The ammonia concentration in the air outlet stream (2K) is 8000 ppm by volume.

Subsurface air is introduced by a blower. In cold climates the subsurface (2M) air can be heated prior to entering the stripper using a gas to liquid heat exchanger (219). This exchanger can be placed is series with the recirculation heat exchanger (28) such that the incoming hot water (2AJ1) is the outlet water (2Q2) of the recirculation exchanger (28). This enables more efficient use of the waste heat. Other sources of heat can also be used.

The heat demand for the flow rate in the example above is approximately 3 MW and a portion of it is used to make up for the heat of evaporation, as a small fraction of the water is lost to evaporation.

The crossflow air uses less energy per unit of flow than the subsurface air. The flow rate of the subsurface air is less than half of the flow rate of the cross flow air. For example, the subsurface air may be 15 to 45% of the total air flow. The headspace may be restricted to a low height or volume, for example 1 m or less. Waste heat, for example from a turbine burning the biogas C, can be used to heat the air or feed liquid. A high temperature in the stripper helps prevent phosphate salts in the feed liquid from settling as the pH rises. Cooling the effluent (2N) after it exits the stripper allows these salts to be precipitated in a controlled location such as a storage tank.

The ammonia-laden air (2K) goes to an ammonia acid scrubber (29). The scrubber uses a counter flow column configuration with air circulating from the bottom up through a packed bed with plastic media to enhance gas/liquid mass transfer surface area. An acid shower with excess sulfuric acid (2V) flows from the top down and reacts with the ammonia gas in the air stream to form ammonium sulfate. Ammonium sulfate is stored in a sump at the bottom of the scrubber column. Ammonium sulfate (2T) is pumped for recirculation and sulfuric acid (2U) is added. Alternatively, water can be recirculated to form ammonium hydroxide for use in place of ammonium sulfate. Sulfuric acid addition is controlled automatically based on a pH set point. Excess sulfuric acid can be added to the recirculation stream to produce an acidic ammonium sulfate solution to reduce ammonia volatilization in the dryer. This is an alternative to sulfuric acid injection (2AL) to the product ammonium sulfate stream. The acid scrubber (29) produces 28 to 30% ammonium sulfate solution when no excess sulfuric acid is dosed. The ammonium sulfate stream (W) goes to a mixer (14) to combine with solids cake (I) and then to the dryer (15). The scrubber exit air with low ammonia concentration (2R) is moved by a fan (210) and discharged to the atmosphere (2S). As an alternative to sending 30% ammonium sulfate solution to the dryer, a concentration system (217) can be used that concentrates the solution to 68%. The concentrator uses waste heat (2AE1 and 2AE2) and vacuum (2AI) and operates at about 70 degrees C. In some cases removing moisture from the ammonium sulfate solution is cost effective compared to removing this moisture in the dryer, mostly when dealing with indirect dryers that are more expensive than direct belt dryers. Alternatively, an ammonia stripping and recovery device described in relation to FIG. 1 can be used.

Any suitable process steps or equipment from FIG. 2 can be used in place of similar process steps of equipment in FIG. 1. Any suitable process steps or equipment from FIG. 1 can be used in place of similar process steps of equipment in FIG. 2. Either system can be used to treat sludge from a wastewater treatment plant. Ammonia reduced liquid may be returned to the wastewater treatment plant. Either of the ammonia removal systems shown in FIG. 3 and FIG. 4 may be used in place of the ammonia removal systems described in relation to FIGS. 1 and 2.

Figure 3:
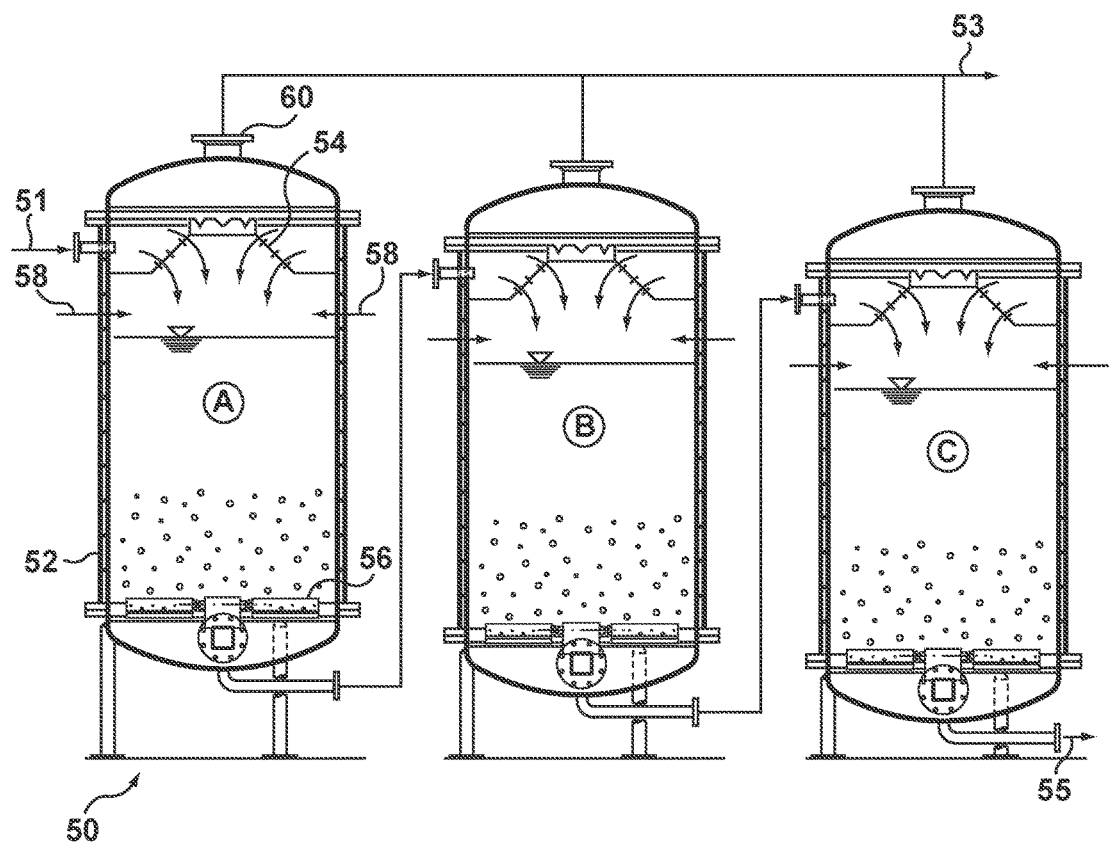
FIG. 3 is schematic representation of an optional ammonia removal system having reactors in series.

FIG. 3 shows an alternative ammonia stripper 50. The stripper 50 has one or more jacket reactors 52. If there are multiple reactors 52, they are preferably connected in series with the liquid effluent from one being fed to the next. Stripper effluent 55, which may be effluent 2N, is removed from the last reactor 52. The reactors 52 may be located at decreasing elevations in the direction of flow such that flow between them may be by gravity. Alternatively, the liquid may be pumped between them. The jacket reactors 52 have jackets around their outer walls allowing them to be heated, for example to about 50 degrees C. or more or about 70 degrees C. or more. Feed water (51) which may be for example filtrate 2J, enters each reactor 52 through a porous baffle 54 which breaks the feed flow up into multiple streams which fall through an air gap before reaching the surface of the liquid in the reactor. Air bubbles are produced in the liquid from a diffuser 56. Gas is collected in the head space of each reactor 52 and removed by connecting their gas outlets 60 to the suction side of a pump. The headspace of a reactor may be at a partial vacuum with the gas outlets 60 being the only gas openings. Optionally, a sweep gas may be added through one or more ports 58. In another option, the sweep gas may flow through one or more reactors in series by connecting the gas outlet 60 of an upstream reactor to the ports 58 of a downstream reactor. One or more of the outlets 60 are corrected to an outlet pipe 53 which may carry, for example, ammonia laden air 2K.

The anaerobic digestion of organic wastes, for example wastes derived from food processing, manure from farms, or sludge from wastewater treatment, results in several residues one of which is the digested sludge or digestate. After leaving the digester, digestate is commonly dewatered, and in some cases fiber is removed. This breaks up the digestate into two main parts: the solids fraction, commonly referred to as cake, and the liquid fraction which can be called centrate, filtrate, reject water or otherwise. The liquid fraction is often re-used in digestion processes, for example as water to dilute the digester feed, or in pre-processing organic wastes to create a feed slurry which can be directed to the digester. In other cases, the liquid fraction may be sent for additional treatment, such as treatment in a conventional activated sludge plant or otherwise. The liquid fraction contains ammonia. The ammonia concentration is preferably reduced before the liquid fraction is used in the processes mentioned above to avoid build up in the digester, or to reduce the cost of post treatment.

Bubbles can be used to strip ammonia from the liquid fraction. These bubbles can be induced by injecting air or steam into a reactor or, alternatively, bubbles can be created by cavitation. Flashing is a similar process which will be considered as a type of cavitation in this document. Cavitation occurs when a liquid experiences a sudden change in pressure and can be induced by several methods. These methods include passing the liquid through a flow restriction such as an orifice or nozzle, flowing the liquid across a restriction in piping or channels such as gates or valves, inducing a pressure change locally at propellers, causing a collision of liquid flows, by ultrasonic radiation or otherwise.

A cavitation based device can remove ammonia without adding chemicals to increase the pH of the liquid fraction. At 70 degrees C., the bubbles drive carbon dioxide out of the liquid. The carbon dioxide is in the liquid fraction as ammonium bicarbonate, which results from the digestion process and is in equilibrium with the high carbon dioxide content of the biogas in the digester headspace, usually 30 to 45%. Stripping carbon dioxide raises the pH to 9.2 or higher. At this high pH and high temperature the majority of the ammonia becomes unionized ammonia gas in the liquid fraction and is driven out of solution and into the stripper headspace by the cavitation bubbles.

Figure 4:
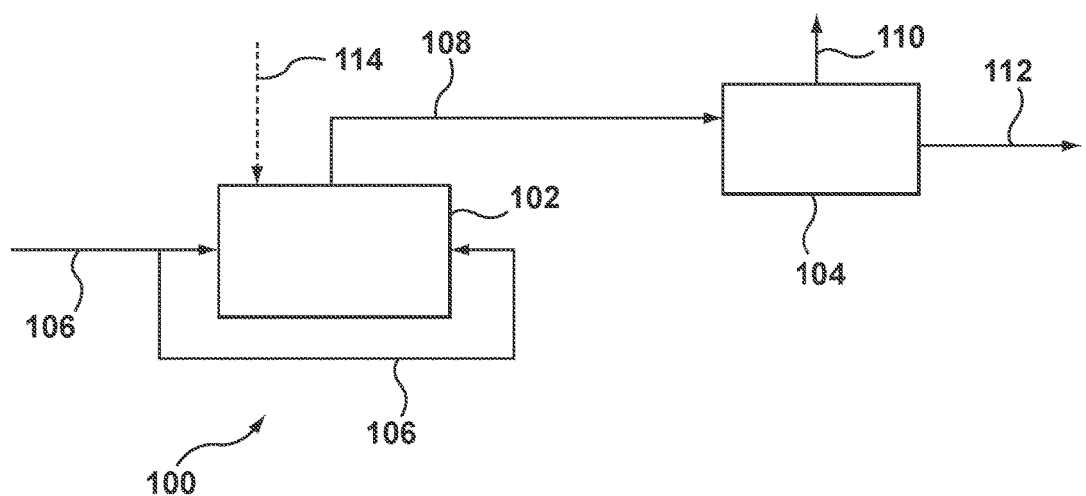
FIG. 4 is a schematic process flow diagram of an alternative ammonia removal system using cavitation.

Referring to FIG. 4, an alternative ammonia removal system 100 has a cavitation device 102 and a de-aerator 104. A de-aerator device is utilized to separate water and/or water vapour from the gas effluent which is carrying the ammonia constituents. A feed liquid 106, such as the liquid fraction of digestate, flows into the cavitation device 102 and leaves as first effluent 108 with entrained bubbles produced by cavitation. The first effluent 108 flows into the de-aerator 104. The bubbles, and possibly some dissolved gas, are separated from the first effluent 108 in the de-aerator 104 to produce a gas stream 110 including ammonia. A second effluent 112 with a reduced ammonia concentration is also drawn from the de-aerator 104. Optionally, the system 100 may have multiple stages. For example, the feed liquid 106 may flow through a first cavitation device 102 and de-aerator 104 which primarily remove carbon dioxide. An effluent form the first stage may then flow through one or more further sets of cavitation devices and de-aerators for ammonia removal.

The cavitation device may be an enclosed device such as a controlled hydrodynamic cavitation device. One example of such a device is sold under the VRTX trade mark by HydroXS BV for use in cooling system descaling. Alternatively, the cavitation device may also draw in a supplemental gas 114 such as air. For example, a cavitation device as used with a cavitation air flotation unit may be adapted for removing ammonia. These devices use a rotating disc aerator which draws ambient air from a shaft to produce microbubbles in water.

The de-aerator 104 comprises a vessel to receive the first effluent 108 and to provide a residence time sufficient for gas bubbles to be collected from the surface of the first effluent 108. The de-aerator preferably operates at ambient pressure or under a partial vacuum. The vacuum may be produced, for example, with an eductor or a fan type unit. Optionally, the first effluent 108 may be sprayed into the vessel or flow over a dispersing medium to help bring very small bubbles to a liquid surface. Further optionally, the vessel may have screens or other media to provide sites for small bubbles to attach and combine with other small bubbles, thus creating large bubbles that are more easily removed. Optionally, ammonia gas separated from water and/or water vapour in the de-aerator 104 may be used as aqueous ammonium hydroxide, optionally after mixing with water.

EXAMPLE

Waste activated sludge was treated in an anaerobic digester at a municipal wastewater treatment plant. Sludge from the digester was dewatered with a centrifuge to produce a centrate. Ammonium bicarbonate was added to the centrate to reach ammonia and alkalinity concentrations typical of a high solids anaerobic digester used to treat industrial and agricultural substrates. No other chemicals were added. The modified centrate was treated in an ammonia removal device and process as described above.

Concentrations of ammonia and alkalinity were measured in the centrate feed to the ammonia stripping device and in the liquid effluent removed from the ammonia stripping device. The results of the experiment are shown in Table 1 below. Process conditions and parameters and device (reactor) volumes during the experiment are given in Table 2 below.

TABLE 1

| Sample | Alkalinity mg/L as CaCO3 | pH | NH3—N mg/L | % Removal Ammonia-N | % Removal Alkalinity |
|---|---|---|---|---|---|
| Feed | 23750 | 8.6 | 7400 | | |
| Effluent | 3750 | 9.2 | 1000 | 86% | 84% |

TABLE 2

| Reactor Volume No Air gal | Reactor Volume With Air gal | Influent gpm | HRT min | Reactor Temperature Deg Celsius | Diffused (bubbled) Air scfm | Crossflow (surface) Air Scfm |
|---|---|---|---|---|---|---|
| 4.56 | 7.13 | 0.128 | 36 | 67 | 20 | 40 |

U.S. Provisional Patent Application No. 61/443,905 (filed Feb. 17, 2011), 61/578,703 (filed Dec. 21, 2011), and 61/707,467 (filed on Sep. 28, 2012); and International Application Number PCT/CA2012/000144 (filed Feb. 17, 2012) are incorporated by reference.

We claim:

1. A process for removing ammonia from a liquid fraction of digestate comprising steps of,
    a) flowing the liquid fraction of digestate through a series of sequential stages provided in a set of jacketed reactors connected in series;
    b) introducing bubbles of air into the liquid fraction of digestate in the stages; and,
    c) extracting ammonia in communication with the surface of the liquid fraction of digestate in the stages.

2. The process of claim 1 wherein the liquid fraction of digestate is heated or maintained at a temperature of 50 degrees C.

3. The process of claim 1 wherein step c) comprises flowing air across the surface of the liquid fraction of digestate in the stages or applying suction to the surface of the liquid fraction of digestate in the stages.

4. The process of claim 1 wherein the liquid fraction of digestate flows downwards through each of the jacketed reactors.

5. The process of claim 1 wherein the bubbles rise upwards through the liquid fraction of digestate in the stages.

6. A process for removing ammonia from a liquid fraction of digestate comprising steps of,
    a) providing bubbles in the liquid fraction of digestate by cavitation; and,
    b) separating the bubbles from the liquid fraction of digestate.

7. The process of claim 6 wherein the liquid fraction of digestate and bubbles are present in a tank and further comprising a step of providing a flow of gas over the surface of the liquid fraction of digestate in the tank.

8. The process of claim 6 performed in multiple stages.

9. The process of claim 6 further comprising a step of separating ammonia gas from water vapour.

10. A process for treating an organic waste comprising steps of,
    a) anaerobic digestion of the organic waste to produce a digestate;
    b) de-watering the digestate to produce a liquid fraction;
    c) removing ammonia from the liquid fraction; and,
    d) treating the liquid fraction by way of an activated sludge process.

11. The process of claim 10 wherein step c) comprises steps of,
    i) flowing the liquid fraction through a series of sequential stages;
    ii) introducing bubbles of air into the liquid fraction in the stages; and,
    iii) extracting one or more gasses in communication with the surface of the liquid fraction in the stages.

12. The process of claim 10 wherein step c) comprises steps of,
   i) providing bubbles in the liquid fraction by one or more of blowing a gas into the liquid fraction and cavitation; and,
   ii) separating the bubbles from the liquid fraction.

13. The process of claim 10 wherein step c) comprises providing bubbles in the liquid fraction.

14. The process of claim 13 wherein step c) comprises producing cavitation bubbles in the liquid fraction.

15. The process of claim 10 wherein step c) comprises forming ammonium hydroxide or ammonium sulfate solution.

16. The process of claim 15 further comprising adding the ammonium hydroxide or ammonium sulfate solution to solids separated from the digestate.

* * * * *